(12) United States Patent
Mecca et al.

(10) Patent No.: US 9,912,128 B2
(45) Date of Patent: Mar. 6, 2018

(54) CIRCUIT BREAKER POSITIONING SYSTEM AND METHOD FOR CONNECTION AND DISCONNECTION THEREOF

(71) Applicant: 9088-5625 QUEBEC INC., Saint-Hubert (CA)

(72) Inventors: Florent Mecca, St-Hubert (CA); Cedric Gaden, Montreal (CA); Jean Bozonat, St-Hubert (CA)

(73) Assignee: 9088-5625 QUEBEC INC., Saint-Hubert, Quebec (CA)

( * ) Notice: Subject to any disclaimer, the term of this patent is extended or adjusted under 35 U.S.C. 154(b) by 0 days.

(21) Appl. No.: 15/455,604

(22) Filed: Mar. 10, 2017

(65) Prior Publication Data

US 2017/0264084 A1    Sep. 14, 2017

Related U.S. Application Data

(60) Provisional application No. 62/306,965, filed on Mar. 11, 2016.

(51) Int. Cl.
*H02B 11/127* (2006.01)
*H01H 71/02* (2006.01)

(52) U.S. Cl.
CPC ......... *H02B 11/127* (2013.01); *H01H 71/025* (2013.01)

(58) Field of Classification Search
CPC ............................ H02B 11/127; H01H 71/025
See application file for complete search history.

(56) References Cited

U.S. PATENT DOCUMENTS

| | | | |
|---|---|---|---|
| 3,767,874 A | 10/1973 | Wilson | |
| 4,017,698 A * | 4/1977 | Kuhn | H02B 11/133 200/50.21 |
| 4,101,744 A | 7/1978 | Wilson | |
| 4,202,027 A | 5/1980 | Ericson | |
| 4,317,160 A | 2/1982 | Tillson et al. | |
| 4,693,132 A | 9/1987 | Buxton et al. | |
| 4,728,757 A * | 3/1988 | Buxton | H02B 11/133 200/50.21 |
| 5,036,427 A * | 7/1991 | Krom | H02B 11/127 200/50.17 |
| 5,097,382 A * | 3/1992 | Leach | H02B 11/127 361/615 |
| 5,200,585 A | 4/1993 | Davies et al. | |
| 5,278,722 A | 1/1994 | Peruso | |
| 6,160,228 A | 12/2000 | Gerbert-Gaillard et al. | |
| 6,184,483 B1 | 2/2001 | Coudert et al. | |
| 6,265,678 B1 | 7/2001 | Robbins et al. | |
| 6,838,626 B2 | 1/2005 | Deylitz et al. | |
| 7,019,229 B1 * | 3/2006 | Weister | H01H 9/22 200/50.01 |
| 7,067,746 B2 | 6/2006 | Deylitz | |

(Continued)

*Primary Examiner* — Xanthia C Cunningham
(74) *Attorney, Agent, or Firm* — Norton Rose Fulbright Canada LLP

(57) ABSTRACT

The present disclosure relates to a circuit breaker positioning system and method including a circuit breaker casing and circuit breaker cell for connecting and disconnecting a circuit breaker to an external electrical circuit. The circuit breaker positioning system includes a motion system for receiving a rotational force from an external source and translating the rotational force into a displacement of the casing relative to the cell.

20 Claims, 8 Drawing Sheets

(56) References Cited

U.S. PATENT DOCUMENTS

| | | |
|---|---|---|
| 7,078,634 B2 | 7/2006 | Anger et al. |
| 7,124,488 B2 * | 10/2006 | Ford ................... H02B 11/12 200/50.24 |
| 7,368,674 B2 * | 5/2008 | Parker ................ H02B 11/127 200/50.21 |
| 7,688,572 B2 * | 3/2010 | Yee ...................... H02B 1/36 200/50.08 |
| 7,964,809 B2 | 6/2011 | Sapuram et al. |
| 8,054,606 B2 * | 11/2011 | Morris .................... H01H 3/26 361/115 |
| 8,119,943 B2 | 2/2012 | Ignasiak et al. |
| 8,283,585 B2 | 10/2012 | Capelli |
| 8,288,669 B2 | 10/2012 | Capelli |
| 8,471,159 B2 | 6/2013 | Han |
| 8,575,502 B2 * | 11/2013 | Yang .................. H02B 11/133 200/50.21 |
| 8,638,561 B2 * | 1/2014 | Lehtola ............... H05K 7/1409 361/724 |
| 8,644,007 B2 | 2/2014 | Pearce et al. |
| 8,891,229 B2 | 11/2014 | Fisher-Carne et al. |
| 9,425,590 B2 * | 8/2016 | Jo .......................... H01H 9/20 |
| 9,607,784 B2 * | 3/2017 | Benke ..................... H01H 9/24 |
| 2009/0000925 A1 * | 1/2009 | Webb ................... H02B 11/127 200/50.24 |
| 2009/0014291 A1 | 1/2009 | Stevenson |
| 2009/0014292 A1 | 1/2009 | Lyu |
| 2009/0015990 A1 * | 1/2009 | Kim ...................... H02B 11/127 361/608 |
| 2009/0255789 A1 * | 10/2009 | Narayanan ........... H02B 11/127 200/50.21 |
| 2009/0257857 A1 * | 10/2009 | Doddapadam Srinivasa Raghavachar ........................... H02B 11/127 414/744.1 |
| 2010/0230256 A1 * | 9/2010 | Lee ....................... H02B 11/133 200/50.21 |
| 2010/0230257 A1 * | 9/2010 | Kim ...................... H01H 33/666 200/50.25 |
| 2010/0294630 A1 * | 11/2010 | Park ..................... H02B 11/127 200/50.25 |
| 2011/0000768 A1 * | 1/2011 | Marushima .............. H01H 3/42 200/50.24 |
| 2011/0073446 A1 | 3/2011 | Marushima et al. |
| 2011/0147172 A1 | 6/2011 | Kim et al. |
| 2011/0214968 A1 | 9/2011 | Waynick |
| 2012/0217223 A1 * | 8/2012 | Kim ...................... H02B 11/133 218/140 |
| 2012/0261239 A1 * | 10/2012 | Kim ....................... H02B 11/24 200/304 |
| 2015/0008109 A1 * | 1/2015 | Frohlich .............. H01H 9/0271 200/303 |

\* cited by examiner

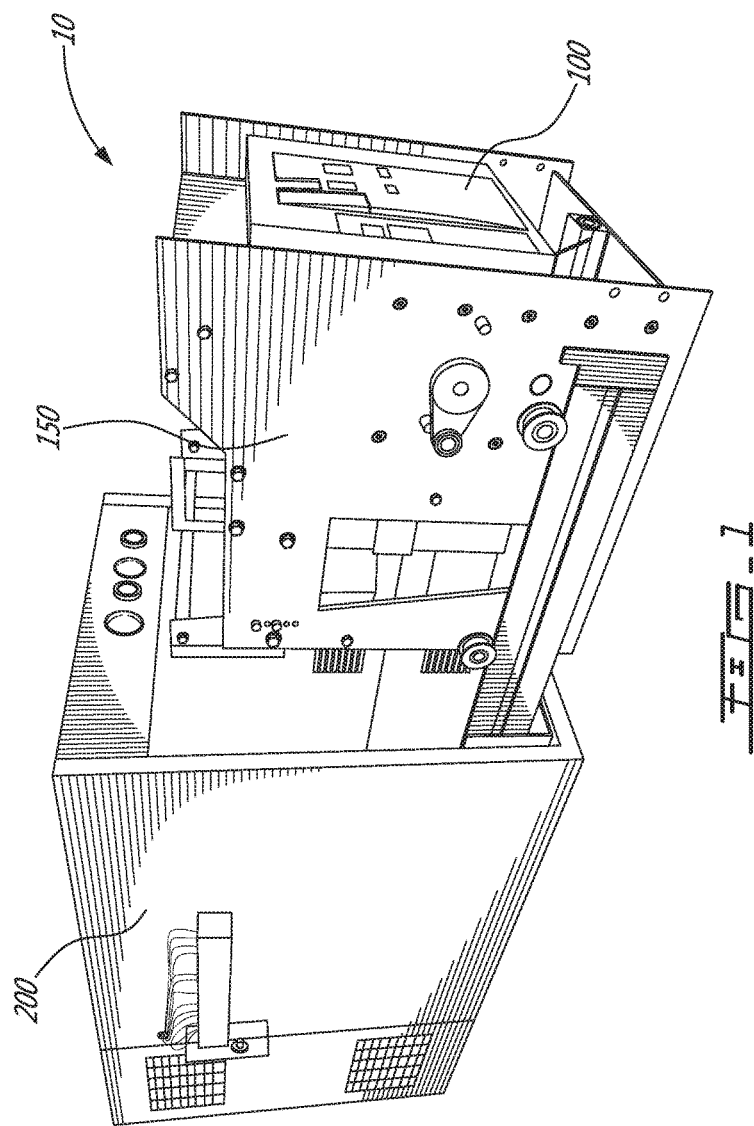

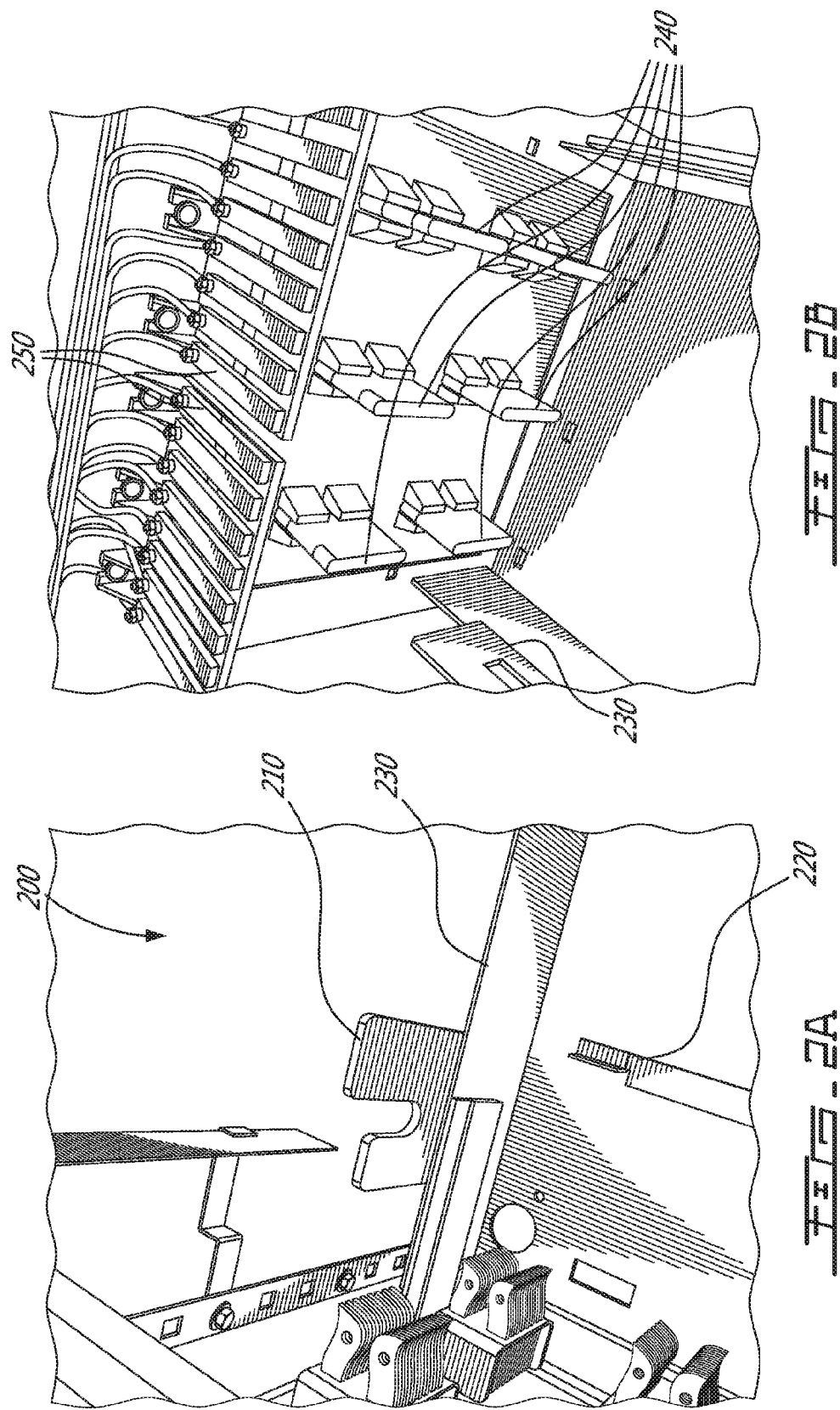

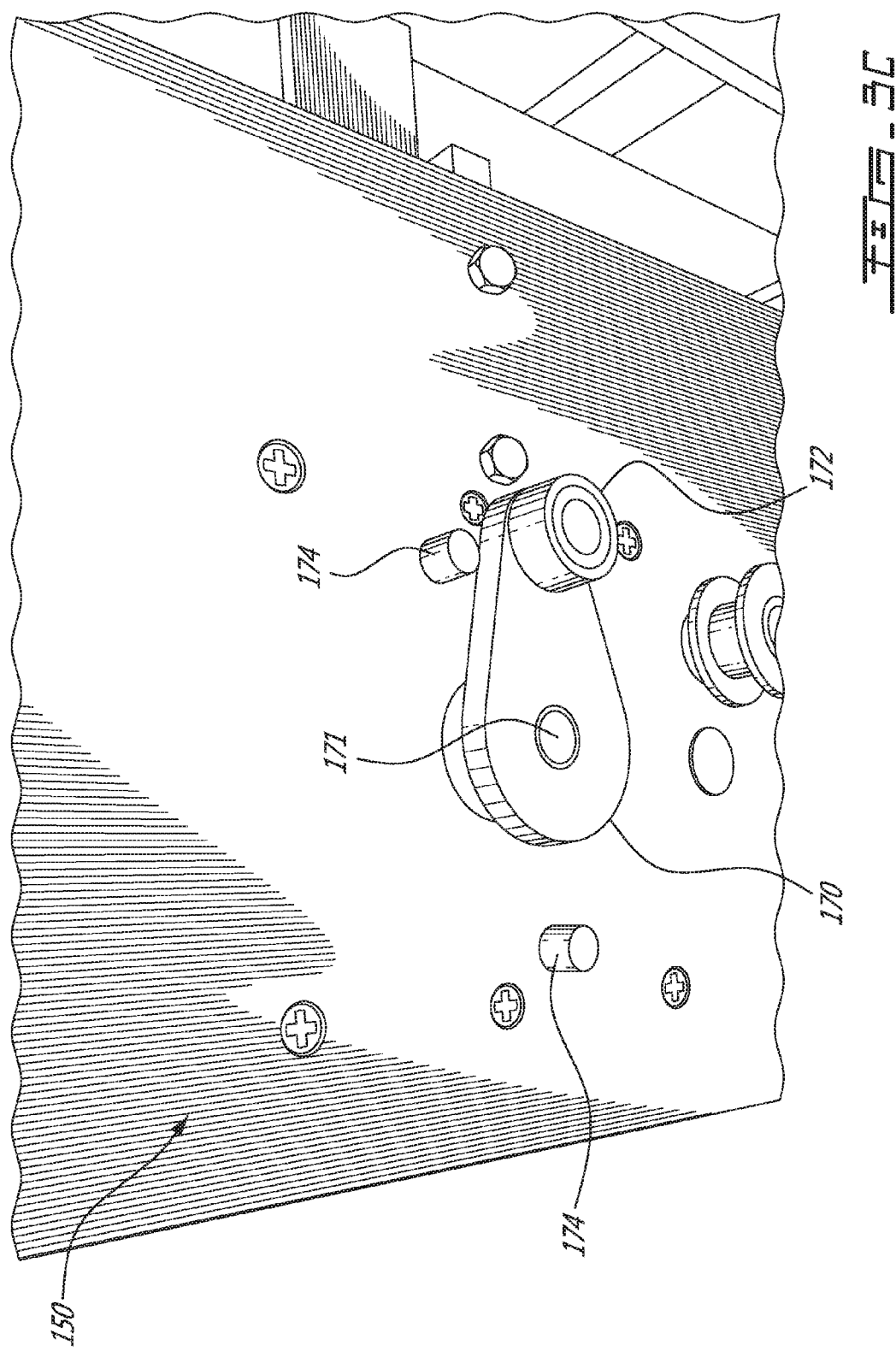

CIRCUIT BREAKER POSITIONING SYSTEM AND METHOD FOR CONNECTION AND DISCONNECTION THEREOF

CROSS-REFERENCE TO RELATED APPLICATIONS

The present application claims the benefit of U.S. Provisional Patent Application No. 62/306,965 filed on Mar. 11, 2016, the contents of which are hereby incorporated by reference.

TECHNICAL FIELD

The present disclosure relates generally to circuit breakers, and more specifically to systems for connecting and disconnecting circuit breakers.

BACKGROUND OF THE ART

Commercial- and industrial-type low-voltage circuit breakers may come in a variety of shapes and sizes, and connecting and disconnecting such circuit breakers in an external circuit may require more than simply actuating a switch or button. Indeed, in some cases circuit breakers may need to be physically displaced with respect to connectors in order to be properly and fully connected or disconnected from the external circuit. This may be done by having movable connectors which can extend or retract, or by displacing the whole circuit breaker, to name a few possibilities.

In cases where the circuit breaker as a whole is displaced to effect connection or disconnection, this may be accomplished through manual labor or by way of a motorized system. While motorized systems may be simpler and less time consuming to operate, there is an inherent risk of damaging or destroying connectors of both the circuit breaker and the external circuit if the motorized system displaces the circuit breaker too quickly, or if too great a force is applied. As such, there is a need for a circuit breaker positioning system which provides greater control for the connecting and disconnecting of a circuit breaker to an external circuit

SUMMARY

The present disclosure relates to a circuit breaker positioning system including a circuit breaker casing and circuit breaker cell for connecting and disconnecting a circuit breaker to an external electrical circuit. The circuit breaker position system includes a motion system for receiving a rotational force from an external source and translating the rotational force into a displacement of the casing relative to the cell.

According to a broad aspect, there is provided a circuit breaker positioning system configured for inserting a circuit breaker into a cell, the cell having two or more cell outer walls defining a first aperture and a plurality of connectors linked to an external circuit. The positioning system comprises a casing. The casing comprises two or more casing outer walls defining a second aperture for receiving the circuit breaker, the casing outer walls spaced to be received within the first aperture between the cell outer walls, and a support configured for supporting the circuit breaker within the casing. The position system also comprises a motion system for displacing the casing relative to the cell inside the first aperture between a position $P_A$ where the circuit breaker is disconnected from the external circuit and a position $P_B$ where the circuit breaker is connected to the external circuit via the connectors in the cell. The motion system comprises a gear system having a first end and a second end, a first member in cooperating engagement with the first end of the gear system, and a second member in cooperating engagement with the second end of the gear system, the first member responsive to an external force to rotate about a first axis and engage the gear system to rotate the second member about a second axis, wherein rotation of the second member causes a displacement of the casing and circuit breaker relative to the cell.

According to another broad aspect, there is provided a method for connecting and disconnecting a circuit breaker to an external circuit via a plurality of connectors disposed inside a first aperture defined by a cell having two or more outer cell walls. The method comprises supporting the circuit breaker in a casing, the casing having two or more casing outer walls defining a second aperture for receiving the circuit breaker, applying a rotational force to a first member of a motion system, and translating the rotational force into a displacement of the casing relative to the cell by engaging a gear system via the first member, the gear system in cooperating engagement with a second member, engagement of the gear system causing rotation of the second member, rotation of the second member causing the circuit breaker to move between a position $P_A$ where the circuit breaker is disconnected from the external circuit and a position $P_B$ where the circuit breaker is connected to the external circuit via the connectors in the cell.

BRIEF DESCRIPTION OF THE DRAWINGS

Further features and advantages of the present invention will become apparent from the following detailed description, taken in combination with the appended drawings, in which:

FIG. 1 is a perspective view of a circuit breaker with a casing outside a breaker cell.

FIG. 2A is an inside perspective view of the breaker cell.

FIG. 2B is an inside rear view of the breaker cell, showing power and control contacts.

FIG. 3C is a side view of the breaker casing with the rotating arm and stoppers.

It will be noted that throughout the appended drawings, like features are identified by like reference numerals.

DETAILED DESCRIPTION

Figure 3A:
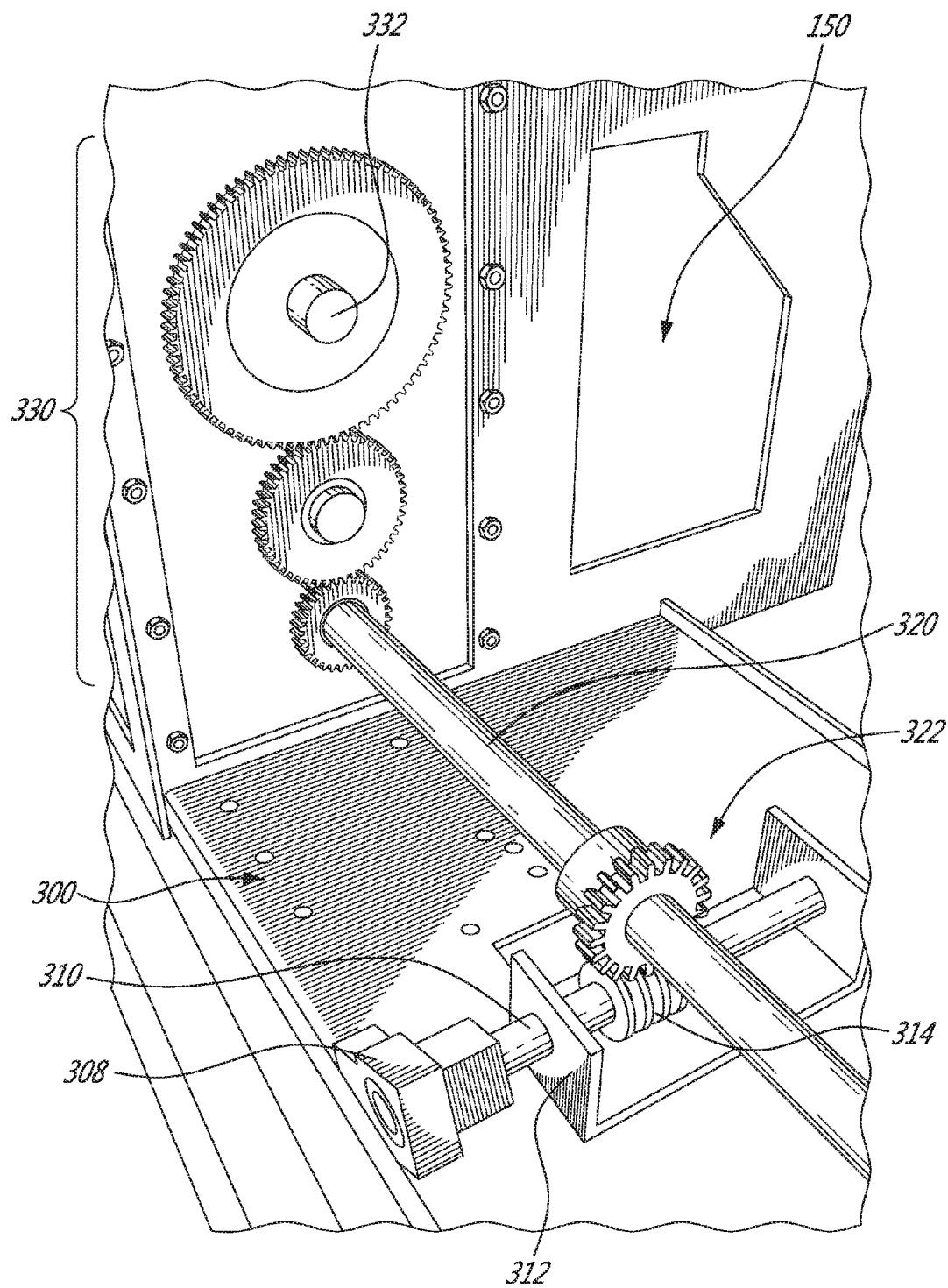
FIG. 3A is an inside view of the breaker casing with a motion system.

Circuit breakers are widely used in multiple applications for protecting sensitive or valuable circuit components from overloading or short circuits. A circuit breaker is an electrical switch which operates automatically when circuit conditions exceed known safe values or limits. The circuit breaker may comprise any suitable displays and controls required for operation: this may include status indicators, on/off switches, reset buttons, and the like. The circuit breaker may also comprise a plurality of connectors, as will be described herein. While circuit breakers may come in a variety of shapes and sizes, the present disclosure will be illustrated by way of circuit breakers which are substantially box-shaped. Other shapes may also apply.

Actuation of the circuit breaker causes an open-circuit before any sensitive or valuable circuit components are affected, thereby protecting them from the excessive current or voltage from the power source. Circuit breakers used in commercial or industrial applications may only be useable for a given "lifecycle" and may wear down over time. Additionally, in some cases a circuit breaker which trips may need certain components replaced or repaired in order for it to be functional again. Therefore, it may be desirable to have access to the circuit breaker for removing it from the external circuit and/or for replacing the circuit breaker in the external circuit with a new, fully functional circuit breaker.

There is described herein a circuit breaker positioning system to displace the circuit breaker from a first position $P_A$, where the circuit breaker is disconnected from the external circuit, to a second position $P_B$, where the circuit breaker is connected to the external circuit, and vice-versa. The circuit breaker may be displaced translationally, for example, or in any other suitable way.

With reference to FIG. 1, a circuit breaker positioning system 10 for moving a circuit breaker 100 within a cell 200 is illustrated and comprises a circuit breaker casing 150 and a motion system (illustrated only in part in FIG. 1A). The casing 150 has at least two casing outer walls defining a first aperture for receiving the circuit breaker 100, and the cell 200 has at least two cell outer walls defining a second aperture. The casing 150 also has a first support for supporting the circuit breaker 100 within the casing 150, and a second support for supporting the casing 150 within the cell 200 in the second aperture. The first aperture is sized to allow the casing 150 to move relative to the cell 200, and the at least two casing outer walls are parallel to the at least two cell outer walls, defining a space therebetween. The circuit breaker 100 and the casing 150 may be displaced within the cell 200 from the position $P_A$, where the circuit breaker 100 is disconnected from the external circuit, to the position $P_B$, where the circuit breaker 100 is connected to the external circuit. The circuit breaker 100 and the casing 150 may also be displaced within the cell 200 from the position $P_B$ to the position $P_A$ to disconnect the circuit breaker 100 from the external circuit.

The distance between the position $P_A$ and the position $P_B$ may be any suitable distance greater than an isolation distance, which is defined as a distance between two electrical contacts sufficient to prevent an electric discharge, such as arcing, to take place between the two electrical contacts. In some embodiments, the isolation distance may be a few centimeters, such as 5 to 10 cm, or any other suitable distance. The circuit breaker positioning system 10 comprises a motion system, for providing relative motion of the casing 150 with respect to the cell 200. The motion system translates a relatively large displacement of a first member at a first end of the motion system resulting from a force applied to the first member, into a relatively small displacement of the casing 150. Displacement of the casing 150 is effected by a second member at a second end of the motion system, which is itself displaced as a result of the force applied to the first member. The second member is engaged with both the cell 200 and the casing 150 in order to move the casing 150 relative to the cell 200.

The motion system also scales the torque produced at the second end of the motion system compared to the torque produced at the first end of the motion system when the force is applied to the first member. The torque experienced by the second member, and by extension the casing 150 and the cell 200, is thus smaller than the torque experienced by the first member. The motion system may comprise a gear system with a plurality of gears having sizes selected to appropriately scale the torque produced at the first end of the motion system to the torque produced at the second end of the motion system for effecting suitable motion of the circuit breaker 100 within the cell 200. Displacement of the circuit breaker 100 between positions $P_A$ and $P_B$ using the circuit breaker positioning system 10 allows for more precise control of the displacement of the circuit breaker 100.

In FIG. 1, the circuit breaker 100 is shown as having the casing 150 attached thereto, and being substantially fully outside the aperture defined by the cell 200. In some embodiments, the casing 150 may be affixed to the circuit breaker 100, and both the circuit breaker 100 and the casing 150 may be inserted into the cell 200 together. Other insertion methods, such as first affixing the casing 150 to the cell 200 and inserting the circuit breaker 100 thereafter, are also considered. The casing 150 and cell 200 as illustrated in FIG. 1 are for example purposes. Other suitable casings 150 and cells 200 are also considered for embodiments where the circuit breaker 100 is shaped differently. The casing 150 may be fitted to the circuit breaker 100 such that the casing 150 may wrap around at least a portion of the sides of the circuit breaker 100: the casing may be affixed to the circuit breaker 100 directly, or may simply rest against the circuit breaker 100.

With reference to FIG. 2A-B, the cell 200 may be generally box-shaped and may comprise a number of walls, including the two cell outer walls defining the first aperture in which the casing 150 (and attached circuit breaker 100) is inserted. The cell 200 may also comprise a back wall and a bottom wall. In some embodiments, the cell 200 may also include a top wall and/or a front wall. Any number of these walls may be moveable with respect to the others: for example, in an embodiment, the cell 200 may have a movable front and/or top wall for allowing insertion of the circuit breaker 100 and the casing 150. In another embodiment, the cell 200 may have at least one movable side wall and a movable front wall for allowing insertion of the circuit breaker 100 and the casing 150. Other combinations and embodiments are also considered. The particular dimensioning of the cell 200 may provide a space between the side walls of the cell and the sides or side walls of the casing 150. In some embodiments, the cell 200 may be one of a group of cells 200 stacked or otherwise arranged in a grid-like configuration.

The cell 200 may comprise at least one socket 210 disposed substantially against a respective side wall of the cell 200. The at least one socket 210 may be claw-shaped, such that two vertical projections of differing heights define a recess therebetween, or may take on any other suitable shape. Each of the at least one socket 210 may be attached or otherwise affixed to a respective side rail 230, which may in turn be affixed to a respective side wall of the cell 200, to the bottom wall of the cell 200, or to any other suitable wall of the cell 200. The cell 200 may further comprise a transverse rail 220 disposed between the at least one side rail 230 and being positioned substantially orthogonal thereto.

Thus, in a particular embodiment, the cell 200 may comprise a pair of substantially opposite side walls, and each may have a respective side rail 230 to which a respective socket 210 may be affixed. The transverse rail 220 may be disposed between the two side rails 230 in substantially orthogonal fashion thereto.

With reference to FIG. 2B, the cell 200 may additionally comprise a plurality of power connectors 240 for supplying power to the circuit breaker 100 and a plurality of control connectors 250 for establishing communication links between the circuit breaker 100 and the external circuit. The connectors 240, 250 may be positioned along the back wall of the cell 200, or along any other suitable wall of the cell 200. While FIG. 2B shows the connectors 240, 250 as being male connectors, it should be noted that other embodiments of the cell 200 may feature female connectors 240, 250, or any suitable combination of male and female connectors 240, 250. Additionally, the particular orientation and setup of the connectors 240, 250 may vary from one embodiment of the cell 200 to another. The connectors 240, 250 may be any suitable kind of connector, including post connectors, plug or socket connectors, blade connectors, ring or spade terminal connectors, or any other suitable type of connector. In some embodiments, the connectors 240, 250 may be keyed connectors.

With reference to FIG. 3A, there is illustrated an example embodiment of the motion system 300. The motion system has a first portion mounted inside the casing and a second portion mounted in the space defined between the at least two casing outer walls and the at least two cell outer walls. The first portion comprises a gear system and a first member in cooperating engagement with the gear system. The second portion comprises a second member in cooperating engagement with the gear system. The first member is rotatable about a first axis and engages the gear system to rotate the second member about a second axis, wherein rotation of the second member displaces the casing relative to the cell inside the first aperture. In the embodiment illustrated, the first member comprises first and second drive shafts 310, 320. A knob or socket 308 attached to the first drive shaft 310 may be disposed for receiving a force from an external source. The first drive shaft 310 may be held within a holder 312 (which may be affixed to the bottom wall of the casing 150). The first drive shaft may be free to rotate both clockwise and counterclockwise within the holder 312. The first drive shaft 310 may also include an endless screw portion 314 disposed thereon which may rotate with the first drive shaft 310. The endless screw portion 314 may comprise any suitable number of threads having any suitable lead and pitch.

The second drive shaft 320 may be disposed orthogonally to the first drive shaft 310, and may extend from one side wall of the casing 150 to the other side wall. The second drive shaft 320 may comprise a gear portion 322, which may be configured for mating with the endless screw portion 314 of the first drive shaft 310, which may cause torque from the first drive shaft 310 to be transferred to the second drive shaft 320.

Though the motion system 300 is described as having two drive shafts 310, 320, other embodiments may make use of more drive shafts, as may be suitable to a particular embodiment. The drive shafts 310, 320, as well as the holder 312, may be of any suitable length and may be made of any suitable material, including steel, iron, aluminum, titanium, and the like. In some embodiments, a single drive shaft may be used.

The first portion of the motion system 300 may further comprise a gear system 330 comprising at least one gear. Each gear of the gear system 300 may be disposed along a respective casing outer wall, and at least one of the gears may be mechanically coupled to the second drive shaft 320. Thus, the torque of the second drive shaft 320 may be transferred to the gear system 330. Additionally, at least one gear of the gear system 330 may be mechanically coupled to a respective second member of the motion system, which may be disposed on a respective casing outer wall. A corresponding gear system 330 and second member may be disposed on opposing faces of a casing outer wall, and may be mechanically coupled through the casing outer wall in any suitable fashion, such as through an axle 332.

In the embodiment shown in FIG. 3A, the gear system 330 comprises three gears: a first gear mechanically coupled to the second drive shaft 320, a second gear mechanically coupled to a respective second member through the axle 332, and a third gear disposed therebetween. It should be noted that the gear system 330 may include any suitable number of gears, including any number of gears required for both adjusting the torque and/or rotational speed of the rotating arm 170 and for setting a desired relationship between a direction of rotation of the external source and a direction of rotation of the rotating arm 170. Additionally, while the gear system 330 shown in FIG. 3A has three gears with substantially aligned respective axes of rotation, in other embodiments the gears of the gear system 330 may be disposed in any suitable fashion. Put differently, the gear system 330 may comprise any suitable number of gears, of any suitable size, positioned in any suitable fashion, for scaling the torque applied by the external force to a torque suitable for causing motion of the second member for displacing the casing 150 within the cell 200, and for scaling the substantially larger torque experienced by the first member to a substantially smaller torque, namely that experienced by the second member.

The motion system 300 may, as described hereinabove, translate or scale the torque applied to the first member, or more specifically the first drive shaft 310, to a smaller torque, which is applied to the second member. This scaling may be accomplished by the gear system 330, as well as by the interconnection between the first drive shaft 310 and the second drive shaft 320, as variations in the pitch and lead of the endless screw portion 314 and the gear portion 322, as well as the respective radii of the first and second drive shafts 310, 320, may also effect a scaling of the torque. Additionally, the motion system 330 may translate a substantially larger displacement effected by an external source into a substantially smaller displacement, namely the displacement of the second member, described in greater detail hereinbelow.

Additionally, while the present disclosure discusses the use of an endless screw portion 314 on the first drive shaft 310 coupled to a gear portion 322 on the second drive shaft 320, other embodiments of the motion system may use a converse system, whereby the first drive shaft 310 comprises a gear portion and the second drive shaft 320 comprises an endless screw portion. Still further embodiments may transfer the torque from the first drive shaft 310 to the second drive shaft 320 by other means, such as via bevel gears, or any other suitable mechanical system.

Figure 3B:
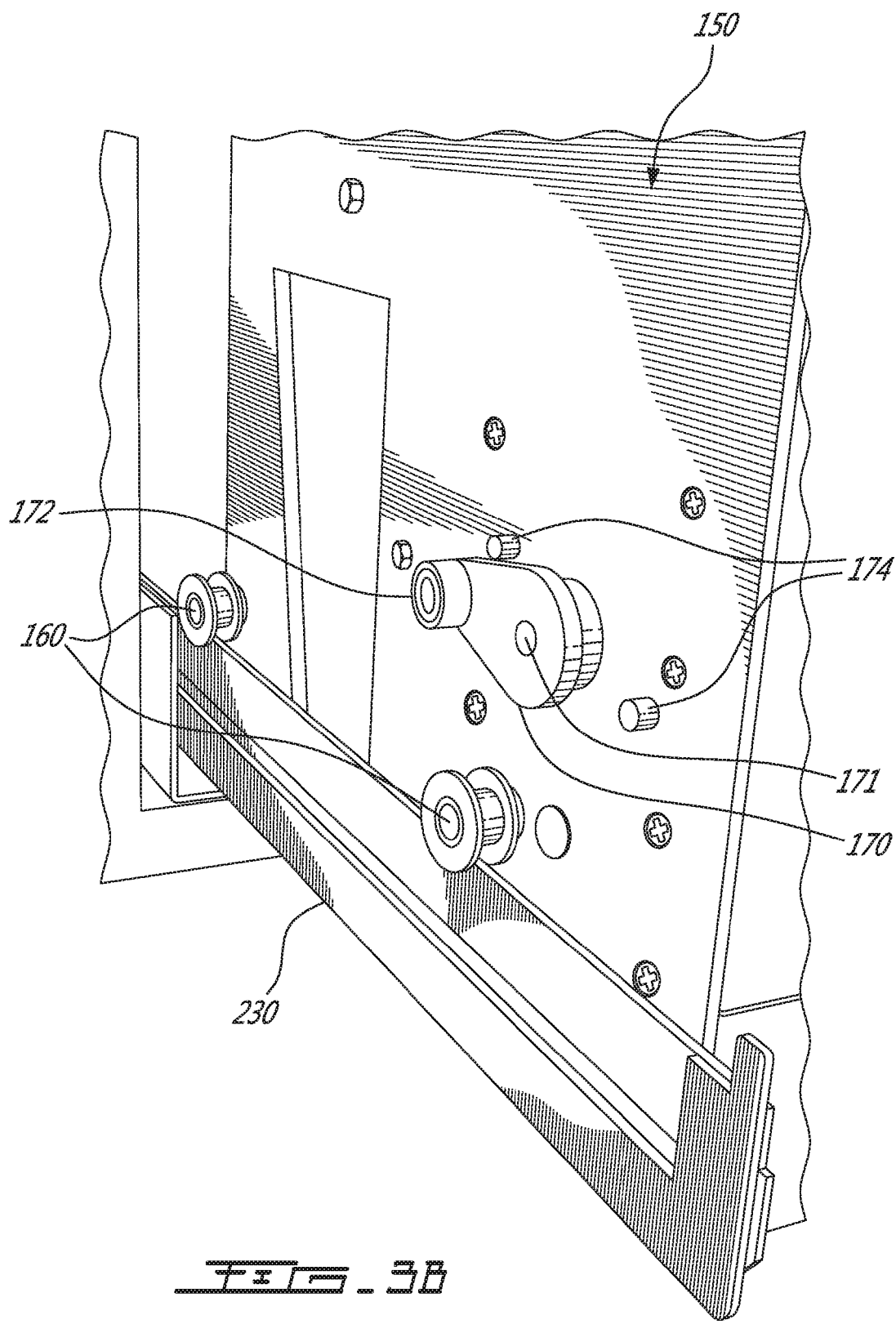
FIG. 3B is a side view of the breaker casing with wheels, a rotating arm, and stoppers.

With reference to FIG. 3B, the circuit breaker casing 150 may be configured for being affixed to the circuit breaker 100, as discussed hereinabove. The casing 150 may comprise the pair of casing outer walls defining the second aperture for receiving the circuit breaker 100. The casing outer walls may be linked in any suitable way, including by a front wall portion, a bottom wall portion, a rear wall portion, or any combination thereof, which may combine to provide a base for supporting the circuit breaker 100 within the casing 150 when inserted into the second aperture. Alternatively, or in addition, the casing 150 may be affixed to the circuit breaker 100 in any suitable fashion, which may also provide support for the circuit breaker 100 within the casing 150.

The casing 150 further comprises the second support for supporting the casing 150 within the cell 200 in the first aperture, which may comprise at least one wheel 160 disposed on the side wall of the casing 150 and being configured for rolling along the side rail 230 of the cell 200. This allows the casing 150 and the circuit breaker 100 to be rolled along the side rails 230 for displacing the casing 150 and the circuit breaker 100 relative to the cell 200. The at least one wheel 160 may be any suitable wheel of any suitable size and made of any suitable material. Additionally, while FIG. 3B shows two wheels 160 being disposed asymmetrically along the side walls of the casing 150, in alternative embodiments the casing 150 may comprise any suitable number of wheels 160 disposed in any suitable fashion.

With additional reference to FIG. 3C, the casing 150 may further support the second member of the motion system 300, which may be at least one rotating arm 170, though other implementations of the second member are also considered. The rotating arm 170 may be disposed along a respective casing outer wall in the space between the casing outer wall and the cell outer wall. In some embodiments, only one such rotating arm 170 may be provided, whereas in other embodiments each casing outer wall may have a respective rotating arm 170. The motion system 300 may comprise an equal number of gear systems 330 as of rotating arms 170. The rotating arm 170 may have any suitable shape and size. In the embodiment illustrated in FIG. 3C, the rotating arm 170 is pear-shaped with a knob 172 disposed at a distal end of the rotating arm 170, though other shapes and configurations are also considered. The knob 172 may be a projection extending from a surface of the rotating arm 170 and may be circular, or may be square, triangular, or any other suitable shape. The rotating arm 170 may rotate about an axis 171, which may be located in a central portion of the rotating arm 170, or in any other suitable location.

The casing 150 may also comprise at least one pair of stoppers 174 disposed on a respective side wall of the casing 150. The casing 150 may comprise as many pairs of stoppers 174 as the number of rotating arms 170. Thus, in an embodiment where each side wall of the casing 150 comprises a respective rotating arm 170, each side wall may further comprise a respective pair of stoppers 174. The stoppers 174 may be projections disposed to contact with the rotating arm 170 so as to limit the rotational movement of the rotating arm 170 to a given arc, or to a position along an arc. The stoppers 174 thus confine the movement of the rotating arm 170 to a given arc determined by the positioning of the stoppers 174.

The rotating arm 170 may travel from a first position, where the rotating arm 170 is in contact with a first stopper 174 along an arc to a second position, where the rotating arm 170 is in contact with a second stopper 174 different from the first stopper 174. In some embodiments, the arc travelled by the rotating arm 170 may be 180°; in other embodiments, the arc travelled may be more than 180°, or less than 180°. The stoppers 174 may thus be disposed to allow the rotating arm 170 to travel any suitable arc distance.

Figure 4:
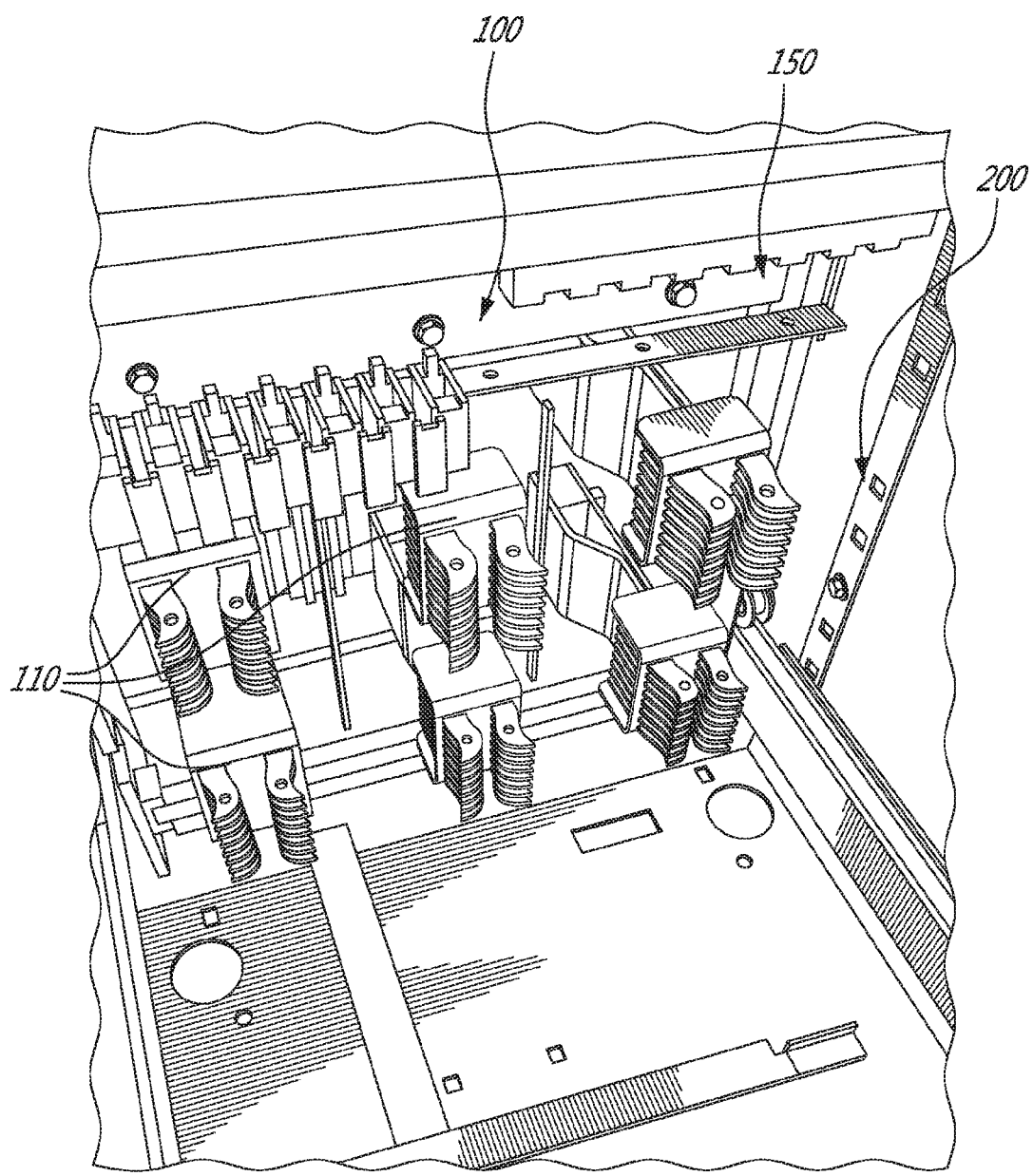
FIG. 4 is a rear-inside view of the breaker cell with the circuit breaker partially inserted.

With reference to FIG. 4, an inside view of cell 200 with the circuit breaker 100 partially inserted is shown. In this particular embodiment, with the circuit breaker 100 partially inserted, a rear portion of the circuit breaker 100 is visible. The circuit breaker 100 may comprise a plurality of breaker connectors 110 disposed on the rear portion of the circuit breaker 100 which allow the circuit breaker 100 to connect to an external circuit. The particular configuration and design of the breaker connectors 110 may vary: while FIG. 4 shows the breaker connectors 240 as being female connectors, it should be noted that other embodiments of the circuit breaker 100 may feature female breaker connectors 110, or any suitable combination of male and female breaker connectors 110. Additionally, the particular orientation and setup of the breaker connectors 110 may vary from one embodiment of the circuit breaker 100 to another. The breaker connectors 110 may be any suitable kind of connector, including post connectors, plug or socket connectors, blade connectors, ring or spade terminal connectors, or any other suitable type of connector. In some embodiments, the breaker connectors 110 may be keyed connectors. Generally speaking, the cell connectors 240 and the breaker connectors 110 should be complementary, allowing for the circuit breaker 100 to be connected into an external circuit by contacting the breaker connectors 110 with the cell connectors 240.

As stated hereinabove, the circuit breaker 100 may be any suitable circuit breaker, and may be rated for any suitable voltages, currents, and power requirements.

Figure 5:
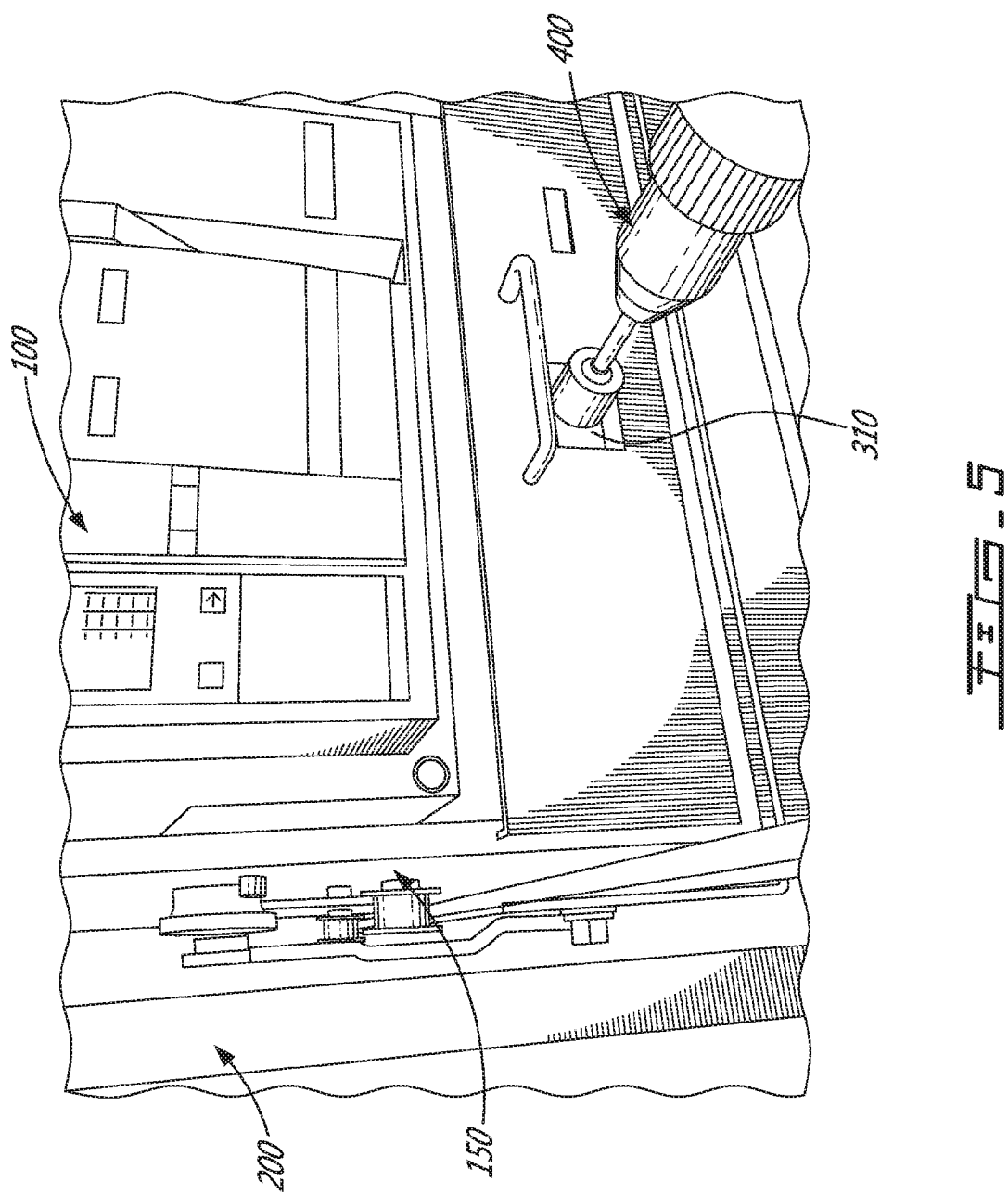
FIG. 5 is a front view of the breaker cell with the circuit breaker partially inserted.

With reference to FIG. 5, the circuit breaker positioning system 10 is configured for receiving a rotational force from an external source. For example, the first drive shaft 310 may be configured for receiving a rotational force from an external source 400, which may be any suitable source of rotational force, including a drill as pictured in FIG. 5. Of course, in other embodiments the external source may be another source of rotational force, including a crank, lever, or other simple machine which may be powered by manual labor, or any suitable motorized source. The external source 400 may provide the rotational force as either a clockwise or counterclockwise rotation. Clockwise rotation may be for connecting the circuit breaker 100 to the external circuit, and counterclockwise rotation may be for disconnecting the circuit breaker 100, or vice-versa.

Figure 6A:
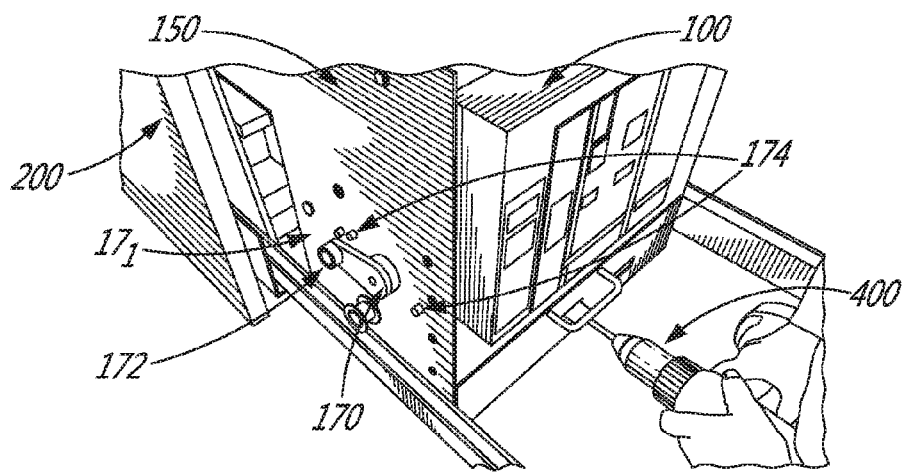
FIG. 6A-C are stop-motion perspective views of the circuit breaker and breaker casing as the motion system is being driven.
Figure 6B:
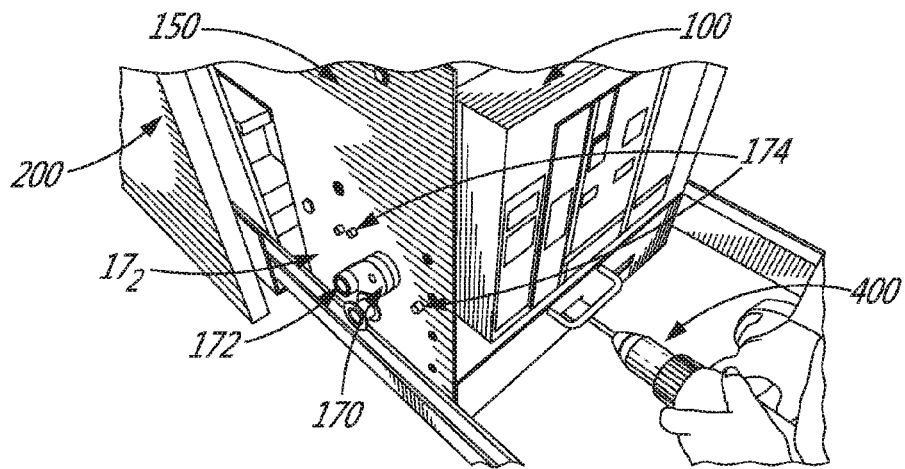
Figure 6C:
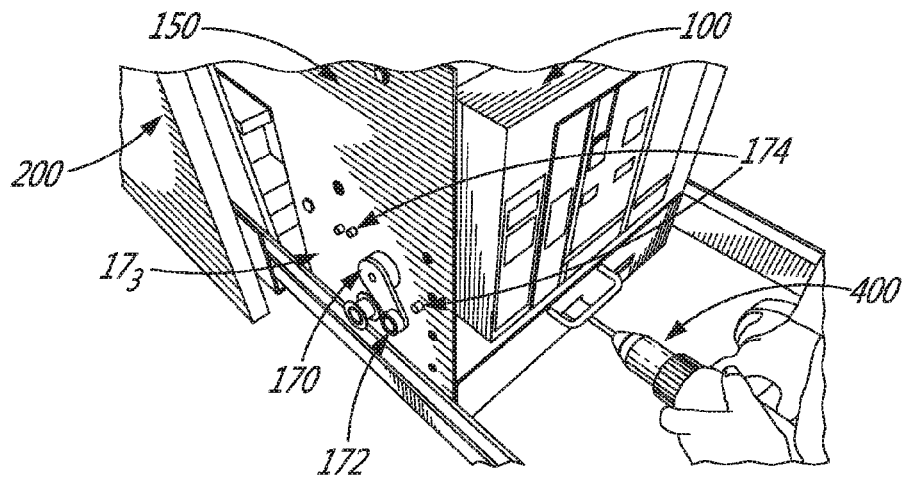

FIGS. 6A-C are stop-motion illustrations of the circuit breaker positioning system 10 as the motion system 300 is being driven by the external force 400. For the purposes of illustration, the circuit breaker 100 and the casing 150 are not fully inserted into the cell 200—this allows for the motion of the rotating arm 170 to be visible as the external source 400 applies the rotational force to the first drive shaft 310.

In FIG. 6A, the rotating arm 710 is at a first position $17_1$ and the knob 172 of the rotating arm 170 is located at a position proximate a first stopper 174. Were the circuit breaker 100 and the casing 150 inserted in the cell 200, the circuit breaker 100 may be at the position $P_A$, i.e. disconnected from the external circuit.

In FIG. 6B, as the force is applied by the external source 400, the rotating arm 170 rotates along an arc to a second position $17_2$, with the position of the knob 172 being between the first and second stoppers 174—here, the circuit breaker may be in a test position $P_T$ between positions $P_A$ and $P_B$. At position $P_T$, a first subset of the breaker connectors 110 is in contact with the control connectors 250 and a second subset of the breaker connectors 110 is not yet in contact with the power connectors 240. When the circuit breaker 100 is in the position $P_T$, the control connectors 250 and the first subset of the breaker connectors 110 may be configured for exchanging information, such as information on the type and rating of the circuit breaker 100, an identifier of the external circuit, and the like. Additionally, a position indicator (not pictured) on the cell 200 may be configured for tracking the position of the circuit breaker 100, and may indicate that the circuit breaker 100 is in the position $P_T$ once the control connectors 250 and the first subset of the breaker connectors 110 are connected. The position indicator may be an indicator light, a screen, a mechanical indicator, or any other suitable visible or audible indicator.

In FIG. 6C, as further force is applied by the external source 400, the rotating arm 170 rotates further along the arc to a third position $17_3$, where the knob 172 is located proximate the second stopper 174. Were the circuit breaker 100 and the casing 150 inserted in the cell 200, the circuit breaker 100 may be at the position $P_B$. In the position $P_B$, the first subset of the breaker connectors 110 is in contact with the control connectors 250, and the second subset of the breaker connectors 110 is in contact with the power connectors 240. In the position $P_B$, the circuit breaker 100 is connected to the external circuit.

In some embodiments, the position indicator may also be configured for indicating whether the circuit breaker 100 is in the position $P_A$ and/or the position $P_B$. The position indicator may, for example, interpret no connection between the breaker connectors 110 and the connectors 240, 250, as the circuit breaker being in position $P_A$, and may further interpret both subsets of the breaker connectors 110 being connected to the connectors 240, 250, respectively, as the circuit breaker 100 being in position $P_B$. In some embodiments, the circuit breaker positioning system 10 may also include a safety mechanism. The safety mechanism may be configured for triggering the circuit breaker 100 to enter an open state responsive to the application of a force by the external source 400 to move the circuit breaker 100 from the position $P_B$. For example, the safety mechanism may be a mechanical or electrical component which is only active when the circuit breaker is in the position $P_B$. Upon detecting a force applied by the external source 400, the safety mechanism may automatically trigger the circuit breaker 100 to enter an open state.

When the circuit breaker 100 and casing 150 are fully inserted into the cell 200, the knob 172 may be positioned within the socket 210 of the cell 200. The socket 210 may be configured for receiving the knob 172 in the recessed portion thereof, thereby substantially imprisoning the knob 172 therein. When the circuit breaker 100 and casing 150 are so positioned, movement of the rotating arm 170 caused by the rotational force applied by the external source 400 may cause the circuit breaker 100 and casing 150 to effect a translational motion within the cell 200 for connecting or disconnecting the circuit breaker 100 from the external circuit. The rotational force may cause the rotating arm 170 to push against one of the projections of the socket 210 which in turn may cause the circuit breaker 100 and casing 150 to move in a direction substantially opposite the force applied by the rotating arm on the socket 210. In this way, the rotational force applied by the external source 400 may cause the circuit breaker 100 to connect to or disconnect from the external circuit.

The above description is meant to be exemplary only, and one skilled in the relevant arts will recognize that changes may be made to the embodiments described without departing from the scope of the invention disclosed. For example, the blocks and/or operations in the flowcharts and drawings described herein are for purposes of example only. There may be many variations to these blocks and/or operations without departing from the teachings of the present disclosure. For instance, the blocks may be performed in a differing order, or blocks may be added, deleted, or modified. The structure illustrated is thus provided for efficiency of teaching the present embodiment. The present disclosure may be embodied in other specific forms without departing from the subject matter of the claims. Also, one skilled in the relevant arts will appreciate that while the systems and methods disclosed and shown herein may comprise a specific number of elements/components, the systems and methods may be modified to include additional or fewer of such elements/components. The present disclosure is also intended to cover and embrace all suitable changes in technology. Modifications which fall within the scope of the present invention will be apparent to those skilled in the art, in light of a review of this disclosure, and such modifications are intended to fall within the appended claims.

The invention claimed is:

1. A circuit breaker positioning system configured for inserting a circuit breaker into a cell, the cell having at least two cell outer walls defining a first aperture and a plurality of connectors linked to an external circuit, the positioning system comprising:
   a casing comprising:
      at least two casing outer walls defining a second aperture for receiving the circuit breaker, the at least two casing outer walls spaced to be received within the first aperture between the at least two cell outer walls; and
      a first support configured for supporting the circuit breaker within the casing; and
   a motion system for displacing the casing relative to the cell inside the first aperture between a position $P_A$ where the circuit breaker is disconnected from the external circuit and a position $P_B$ where the circuit breaker is connected to the external circuit via the connectors in the cell, the motion system comprising:
      a gear system having a first end and a second end;
      a first member in cooperating engagement with the first end of the gear system; and
      a second member in cooperating engagement with the second end of the gear system, the first member responsive to an external force to rotate about a first axis and engage the gear system to rotate the second member about a second axis, wherein rotation of the second member causes a displacement of the casing and circuit breaker relative to the cell.

2. The system of claim 1, wherein the casing comprises a second support configured for supporting the casing within the cell.

3. The system of claim 2, wherein the second support comprises at least one wheel disposed on each one of the at least two casing side walls and configured for rolling along a side rail of the cell.

4. The system of claim 1, wherein the first member comprises:
   a first drive shaft held within a holder and free to rotate both clockwise and counterclockwise within the holder;
   a second drive shaft disposed orthogonally to the first drive shaft, the second drive shaft mechanically coupled to the first end of the gear system; and
   an endless screw portion and a gear portion matingly engaged and disposed on the first drive shaft and the second drive shaft, for translating a torque applied to the first drive shaft towards the second drive shaft.

5. The system of claim 1, wherein the gear system comprises at least three cooperating gears of increasing size, a smallest one of the gears at the first end of the gear system and a largest one of the gears at the second end of the gear system.

6. The system of claim 1, wherein the second member comprises a rotating arm having a first end mechanically coupled to the second end of the gear system and a second end engaged with the casing.

7. The system of claim 6, wherein the rotating arm is disposed on a first side of one of the at least two casing outer walls, and the gear system is disposed on a second and opposite side of the one of the at least two casing outer walls, the first side facing one of the at least two cell outer walls.

8. The system of claim 6, wherein the second member further comprises a pair of stoppers to confine movement of the rotating arm along a displacement path.

9. The system of claim 1, further comprising a safety mechanism configured for triggering the circuit breaker to enter an open state in response to displacement of the circuit breaker from the position $P_B$.

10. The system of claim 1, wherein the second member engages at least one of the at least two cell outer walls and rotational movement of the second member effects a translational motion of the casing and circuit breaker within the cell.

11. A method for connecting and disconnecting a circuit breaker to an external circuit via a plurality of connectors disposed inside a first aperture defined by a cell having at least two outer cell walls, the method comprising:
   supporting the circuit breaker in a casing, the casing having at least two casing outer walls defining a second aperture for receiving the circuit breaker;
   applying a rotational force to a first member of a motion system; and
   translating the rotational force into a displacement of the casing relative to the cell by engaging a gear system via the first member, the gear system in cooperating engagement with a second member, engagement of the gear system causing rotation of the second member, rotation of the second member causing the circuit breaker to move between a position $P_A$ where the circuit breaker is disconnected from the external circuit and a position $P_B$ where the circuit breaker is connected to the external circuit via the connectors in the cell.

12. The method of claim 11, wherein translating the rotational force into a displacement of the casing relative to the cell comprises applying a translational movement of the casing and circuit breaker within the cell in response to rotational movement of the second member.

13. The method of claim 12, wherein applying the translational movement comprises rolling the casing and circuit breaker along side rails of the cell.

14. The method of claim 11, wherein the second member is at a first position when the circuit breaker is at position $P_A$ and at a second position when the circuit breaker is at position $P_B$.

15. The method of claim 14, wherein a pair of stoppers confine movement of the rotating arm along a displacement path between the first position and the second position.

16. The method of claim 11, wherein a position $P_T$ between positions $P_A$ and $P_B$ corresponds to a test position, where a first subset of the plurality of connectors are in contact with the circuit breaker and a second subset of the plurality of connectors are not in contact with the circuit breaker.

17. The method of claim 11, wherein a position indicator tracks the displacement of the circuit breaker between positions $P_A$ and $P_B$ and displays a corresponding position.

18. The method of claim 11, wherein supporting the circuit breaker in the casing comprises affixing the circuit breaker to the casing and inserting the circuit breaker and the casing together into the cell.

19. The method of claim 11, wherein the first member comprises:
   a first drive shaft held within a holder and free to rotate both clockwise and counterclockwise within the holder;
   a second drive shaft disposed orthogonally to the first drive shaft, the second drive shaft mechanically coupled to the gear system; and
   an endless screw portion and a gear portion matingly engaged and disposed on the first drive shaft and the second drive shaft, for translating a torque applied to the first drive shaft towards the second drive shaft.

20. The method of claim 11, wherein the gear system comprises at least three cooperating gears of increasing size, a smallest one of the gears mechanically coupled to the first member and a largest one of the gears mechanically coupled to the second member.

* * * * *